(12) United States Patent
Alakuijala et al.

(10) Patent No.: US 11,166,022 B2
(45) Date of Patent: Nov. 2, 2021

(54) QUANTIZATION CONSTRAINED NEURAL IMAGE CODING

(71) Applicant: GOOGLE LLC, Mountain View, CA (US)

(72) Inventors: Jyrki Alakuijala, Wollerau (CH); George Toderici, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 20 days.

(21) Appl. No.: 16/430,889

(22) Filed: Jun. 4, 2019

(65) Prior Publication Data

US 2020/0389645 A1 Dec. 10, 2020

(51) Int. Cl.
*H04N 19/124* (2014.01)
*H04N 19/117* (2014.01)
*H04N 19/82* (2014.01)

(52) U.S. Cl.
CPC ......... *H04N 19/124* (2014.11); *H04N 19/117* (2014.11); *H04N 19/82* (2014.11)

(58) Field of Classification Search
CPC ..... H04N 19/124; H04N 19/82; H04N 19/117
See application file for complete search history.

(56) References Cited

U.S. PATENT DOCUMENTS 6,421,467 B1 * 7/2002 Mitra .................... G06K 9/6222
382/240
2014/0044167 A1 * 2/2014 Jung .................... H04N 19/147
375/240.12

2017/0372193 A1 12/2017 Mailhe et al.
2018/0286037 A1 * 10/2018 Zaharchuk ............ G06T 7/0012
2019/0213716 A1 * 7/2019 Oniki ...................... G06T 5/004
(Continued)

FOREIGN PATENT DOCUMENTS

WO 2019031410 A1 2/2019

OTHER PUBLICATIONS

Lo et al., "Optimization of Wavelet Decomposition for Image Compression and Feature Preservation," IEEE Transactions on Medical Imaging, vol. 22, No. 9, Sep. 2003 (Year: 2003).*
(Continued)

*Primary Examiner* — Joseph G Ustaris
*Assistant Examiner* — Jill D Sechser
(74) *Attorney, Agent, or Firm* — Young Basile Hanlon & MacFarlane, P.C.

(57) ABSTRACT

Artificial image generation may include obtaining a source image, identifying quantization information from the source image, wherein identifying the quantization information includes identifying multiresolution quantization interval information from the source image, generating a restoration filtered image by restoration filtering the source image, generating a constrained restoration filtered image by constraining the restoration filtered image based on the quantization information, obtaining an unconstrained artificial image based on the constrained restoration filtered image and a generative artificial neural network obtained using a generative adversarial network, obtaining the artificial image by constraining the unconstrained artificial image based on the quantization information, and outputting the artificial image.

20 Claims, 8 Drawing Sheets

(56) References Cited

U.S. PATENT DOCUMENTS

| | | | |
|---|---|---|---|
| 2020/0184318 A1* | 6/2020 | Minezawa | G06K 9/38 |
| 2020/0184603 A1* | 6/2020 | Mukherjee | G06T 3/40 |
| 2020/0213587 A1* | 7/2020 | Galpin | G06N 3/08 |
| 2020/0252654 A1* | 8/2020 | Su | H04N 19/107 |

OTHER PUBLICATIONS

Ma et al., "Image and Video Compression With Neural Networks: A Review," IEEE Transactions on Circuits and Systems for Video Technology, vol. 30, No. 6, Jun. 2020, Date of publication Apr. 17, 2019 (Year: 2019).*

Bayar et al., "Constrained Convolutional Neural Networks: A New Approach Towards General Purpose Image Manipulation Detection," IEEE Transactions on Information Forensics and Security, vol. 13, No. 11, pp. 2691-2706, Nov. 2018. (Year: 2018).*

Lagendijk et al., "Regularized Iterative Image Restoration with Ringing Reduction,", IEEE Transactions on Acoustics, Speech, and Signal Processing, vol. 36, No. 12, pp. 1874-1888, Dec. 1988, (Year: 1998).*

Dong Chao et al: "Compression Artifacts Reduction by a Deep Convolutional Network", 2015 IEEE International Conference on Computer Vision (ICCV), IEEE, Dec. 7, 2015, pp. 576-584.

Quijas Jonathan et al: "Removing JPEG blocking artifacts using machine learning", 2014 Southwest Symposium on Image Analysis and Interpretation, IEEE, Apr. 6, 2014, pp. 77-80.

International Search Report and Written Opinion of International Application No. PCT/US2019/062954 dated Apr. 1, 2020; 14 pages.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

QUANTIZATION CONSTRAINED NEURAL IMAGE CODING

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using quantization constrained neural image coding.

SUMMARY

This application relates to encoding and decoding of image data, video stream data, or both for transmission or storage. Disclosed herein are aspects of systems, methods, and apparatuses for encoding and decoding using quantization constrained neural image coding.

An aspect is a method for image coding using quantization constrained neural image coding. Image coding using quantization constrained neural image coding may include generating, by a processor, an artificial image and outputting the artificial image. Generating the artificial image may include obtaining a source image, identifying quantization information from the source image, wherein identifying the quantization information includes identifying multiresolution quantization interval information from the source image, generating a restoration filtered image by restoration filtering the source image, generating a constrained restoration filtered image by constraining the restoration filtered image based on the quantization information, obtaining an unconstrained artificial image based on the constrained restoration filtered image and a generative artificial neural network obtained using a generative adversarial network, and obtaining the artificial image by constraining the unconstrained artificial image based on the quantization information.

Another aspect is a method for image coding using quantization constrained neural image coding. Image coding using quantization constrained neural image coding may include generating, by a processor, an artificial image and outputting the artificial image. Generating the artificial image may include obtaining a source image, identifying quantization information from the source image, and obtaining the artificial image based on the source image, the quantization information, and a machine learning model.

Another aspect is a method for image coding using quantization constrained neural image coding. Image coding using quantization constrained neural image coding may include generating, by a processor, an artificial image and outputting the artificial image. Generating the artificial image may include obtaining a source image, identifying quantization information from the source image, and generating a constrained restoration filtered image based on a defined cardinality of iterations of constrained restoration filtered image generation. Each iteration of constrained restoration filtered image generation may include generating a restoration filtered image by restoration filtering a restoration filtering input image, wherein, on a condition that the iteration of constrained restoration filtered image generation is a first iteration of constrained restoration filtered image generation, using the source image as the restoration filtering input image, on a condition that the iteration of constrained restoration filtered image generation is an iteration of constrained restoration filtered image generation subsequent to the first iteration of constrained restoration filtered image generation, using the constrained restoration filtered image obtained by an immediately preceding iteration of constrained restoration filtered image generation as the restoration filtering input image, and constraining the restoration filtered image based on the quantization information to obtain the constrained restoration filtered image. Generating the artificial image may include obtaining the artificial image based on an artificial image generation input image, the quantization information, and a generative artificial neural network, wherein obtaining the artificial image includes a defined cardinality of iterations of artificial image generation. Each iteration of the artificial image generation may include inputting the artificial image generation input image to the generative artificial neural network, wherein, on a condition that the iteration of the artificial image generation is a first iteration of artificial image generation, using the constrained restoration filtered image as the artificial image generation input image, on a condition that the iteration of the artificial image generation is an iteration of artificial image generation subsequent to the first iteration of artificial image generation, using the artificial image obtained by an immediately preceding iteration of artificial image generation as the artificial image generation input image, in response to inputting the artificial image generation input image to the generative artificial neural network, obtaining an unconstrained artificial image from the generative artificial neural network, and constraining the unconstrained artificial image based on the quantization information to obtain the artificial image.

Another aspect is an apparatus for image coding using quantization constrained neural image coding. The apparatus may include a processor configured to generate an artificial image and output the artificial image. The processor may be configured to generate the artificial image by obtaining a source image, identifying quantization information from the source image, wherein identifying the quantization information includes identifying multiresolution quantization interval information from the source image, generating a restoration filtered image by restoration filtering the source image, generating a constrained restoration filtered image by constraining the restoration filtered image based on the quantization information, obtaining an unconstrained artificial image based on the constrained restoration filtered image and a generative artificial neural network obtained using a generative adversarial network, and obtaining the artificial image by constraining the unconstrained artificial image based on the quantization information.

Another aspect is an apparatus for image coding using quantization constrained neural image coding. The apparatus may include a processor configured to generate an artificial image and output the artificial image. The processor may be configured to generate the artificial image by obtaining a source image, identifying quantization information from the source image, and obtaining the artificial image based on the source image, the quantization information, and a machine learning model.

Another aspect is an apparatus for image coding using quantization constrained neural image coding. The apparatus may include a processor configured to generate an artificial image and output the artificial image. The processor may be configured to generate the artificial image by obtaining a source image, identifying quantization information from the source image, and generating a constrained restoration filtered image based on a defined cardinality of iterations of constrained restoration filtered image generation. Each iteration of constrained restoration filtered image generation may include generating a restoration filtered image by restoration filtering a restoration filtering input image, wherein, on a condition that the iteration of constrained restoration filtered image generation is a first iteration of constrained restoration filtered image generation, using the source image as the restoration filtering input image, on a condition that the iteration of constrained restoration filtered image generation is an iteration of constrained restoration filtered image generation subsequent to the first iteration of constrained restoration filtered image generation, using the constrained restoration filtered image obtained by an immediately preceding iteration of constrained restoration filtered image generation as the restoration filtering input image, and constraining the restoration filtered image based on the quantization information to obtain the constrained restoration filtered image. Generating the artificial image may include obtaining the artificial image based on an artificial image generation input image, the quantization information, and a generative artificial neural network, wherein obtaining the artificial image includes a defined cardinality of iterations of artificial image generation. Each iteration of the artificial image generation may include inputting the artificial image generation input image to the generative artificial neural network, wherein, on a condition that the iteration of the artificial image generation is a first iteration of artificial image generation, using the constrained restoration filtered image as the artificial image generation input image, on a condition that the iteration of the artificial image generation is an iteration of artificial image generation subsequent to the first iteration of artificial image generation, using the artificial image obtained by an immediately preceding iteration of artificial image generation as the artificial image generation input image, in response to inputting the artificial image generation input image to the generative artificial neural network, obtaining an unconstrained artificial image from the generative artificial neural network, and constraining the unconstrained artificial image based on the quantization information to obtain the artificial image.

In some implementations, the multiresolution quantization interval information may include respective quantization interval information for two or more block sizes (resolutions) from a defined set of block sizes, such as 8×8, 16×16, 32×32, and 64×64. The quantization interval information for a block size may be a bit or a flag and may indicate whether the top-left transform coefficient (DC value) for the block is within the upper or lower portion of the corresponding quantization interval or range. In some implementations, an artificial image may include a combination of image detail from an original or source image and artificial image detail generated using an artificial intelligence or machine learning model.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
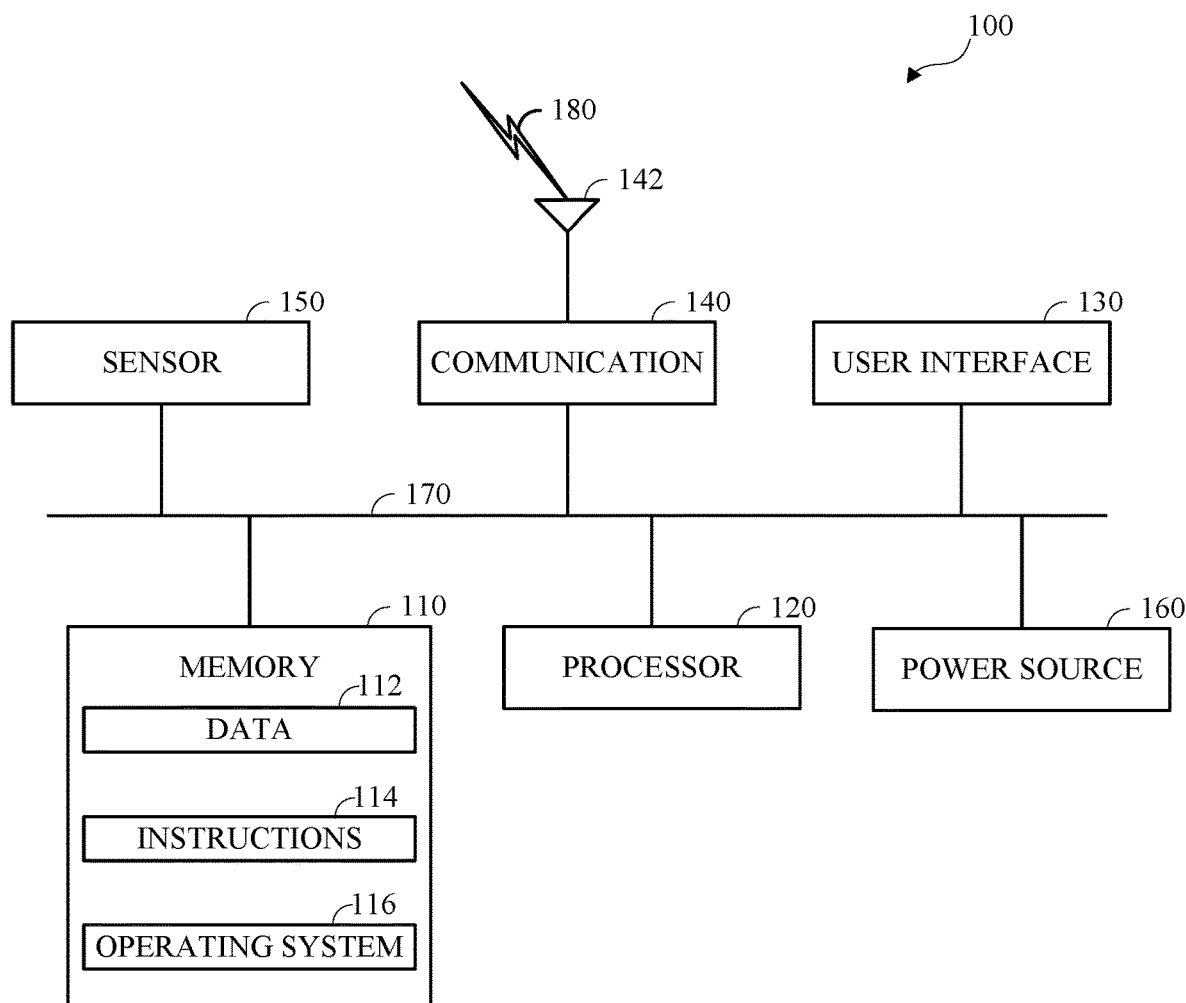
FIG. 1 is a diagram of a computing device in accordance with implementations of this disclosure.

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information.

In some implementations, the reconstructed image may include coding artifacts, such as quantization error (or mach banding) artifacts, blocking (or tiling) artifacts, ringing artifacts, or a combination thereof, which may limit the visual quality of the reconstructed image. In some implementations, the reconstructed image may omit image detail relative to the input image.

Implementations of quantization constrained neural image coding may reduce or eliminate coding artifacts. For example, quantization constrained neural image coding may include using multiresolution quantization interval information. Using multiresolution quantization interval information may include encoding using multiresolution quantization interval information and decoding using multiresolution quantization interval information. Encoding using multiresolution quantization interval information may include determining quantization interval information indicating a correlation between average transform coefficient values and respective quantization parameters on a block basis at multiple resolutions, such as 8×8, 16×16, 32×32, and 64×64, and including the multiresolution quantization interval information with the encoded image. Decoding using multiresolution quantization interval information may include decoding the multiresolution quantization interval information for an image and using the multiresolution quantization interval information to reduce or eliminate coding artifacts, such as mach banding. In another example, quantization constrained neural image coding may include performing one or more iterations of image restoration filtering to reduce or eliminate coding artifacts, such as blocking artifacts and ringing artifacts. In another example, quantization constrained neural image coding may include using a generative artificial neural network to improve image quality, relative to the image restoration filtered image, by adding artificially identified image detail.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
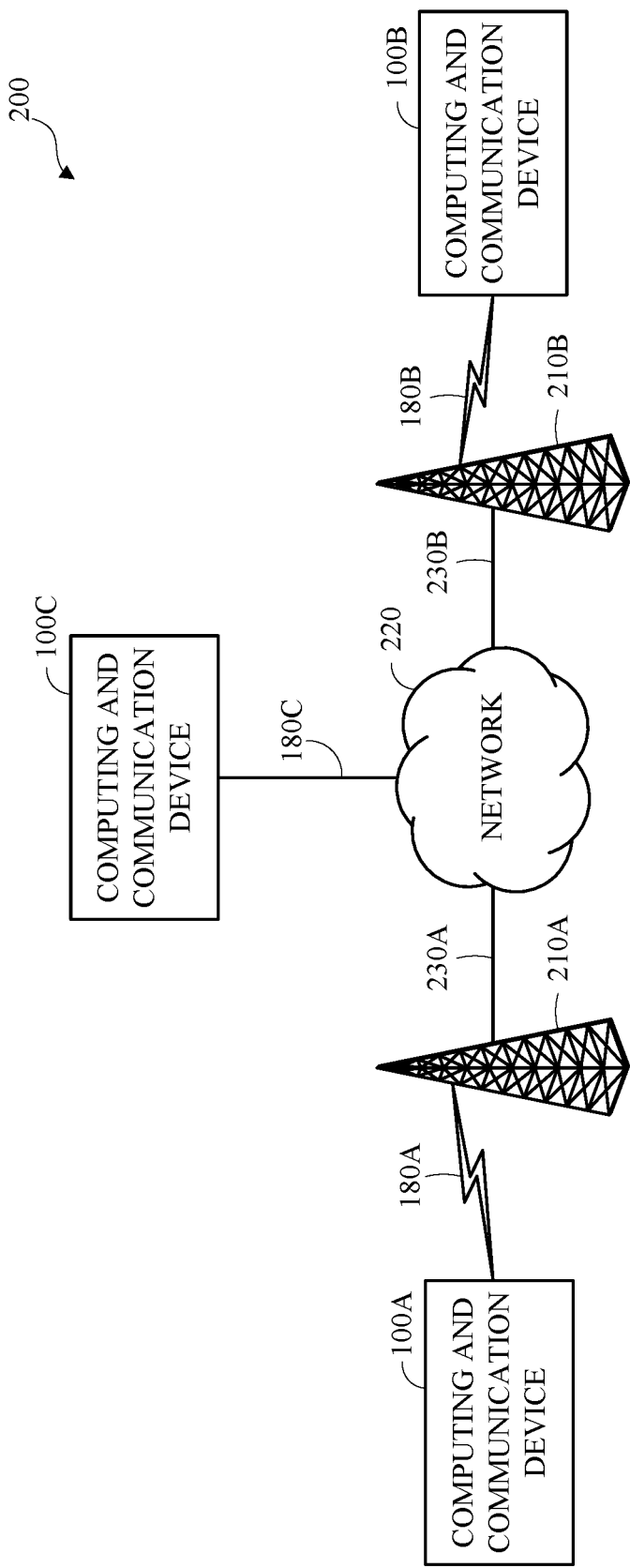
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
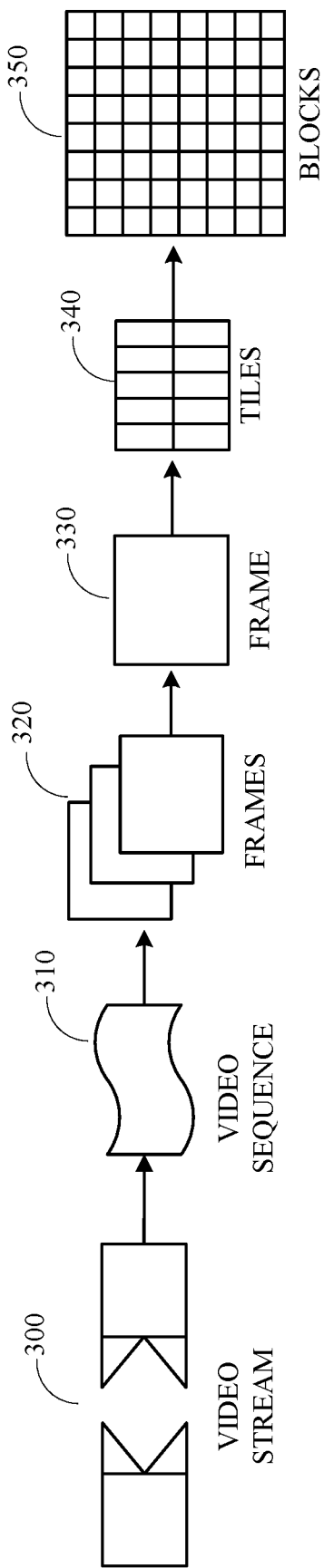
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
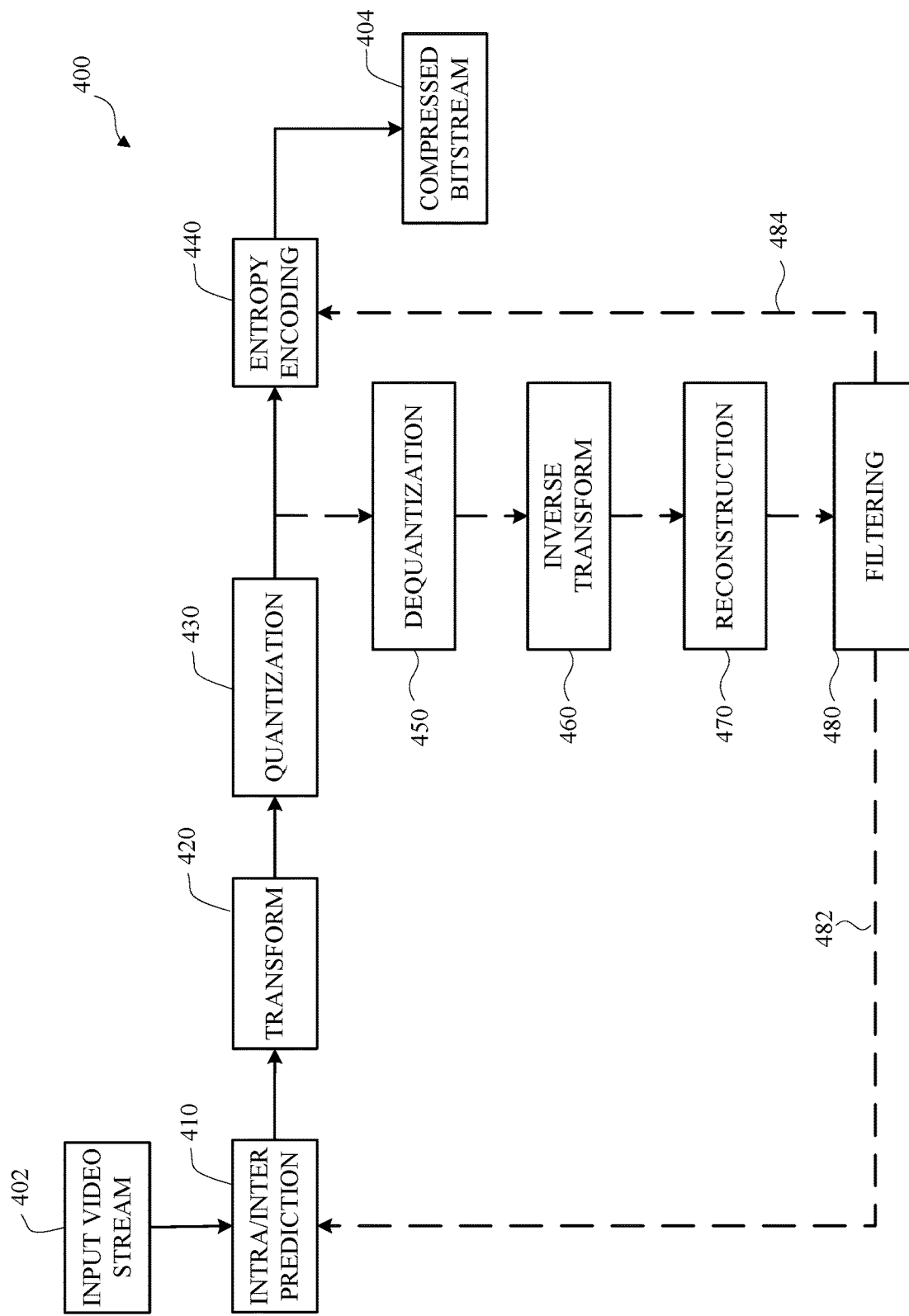
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loéve Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
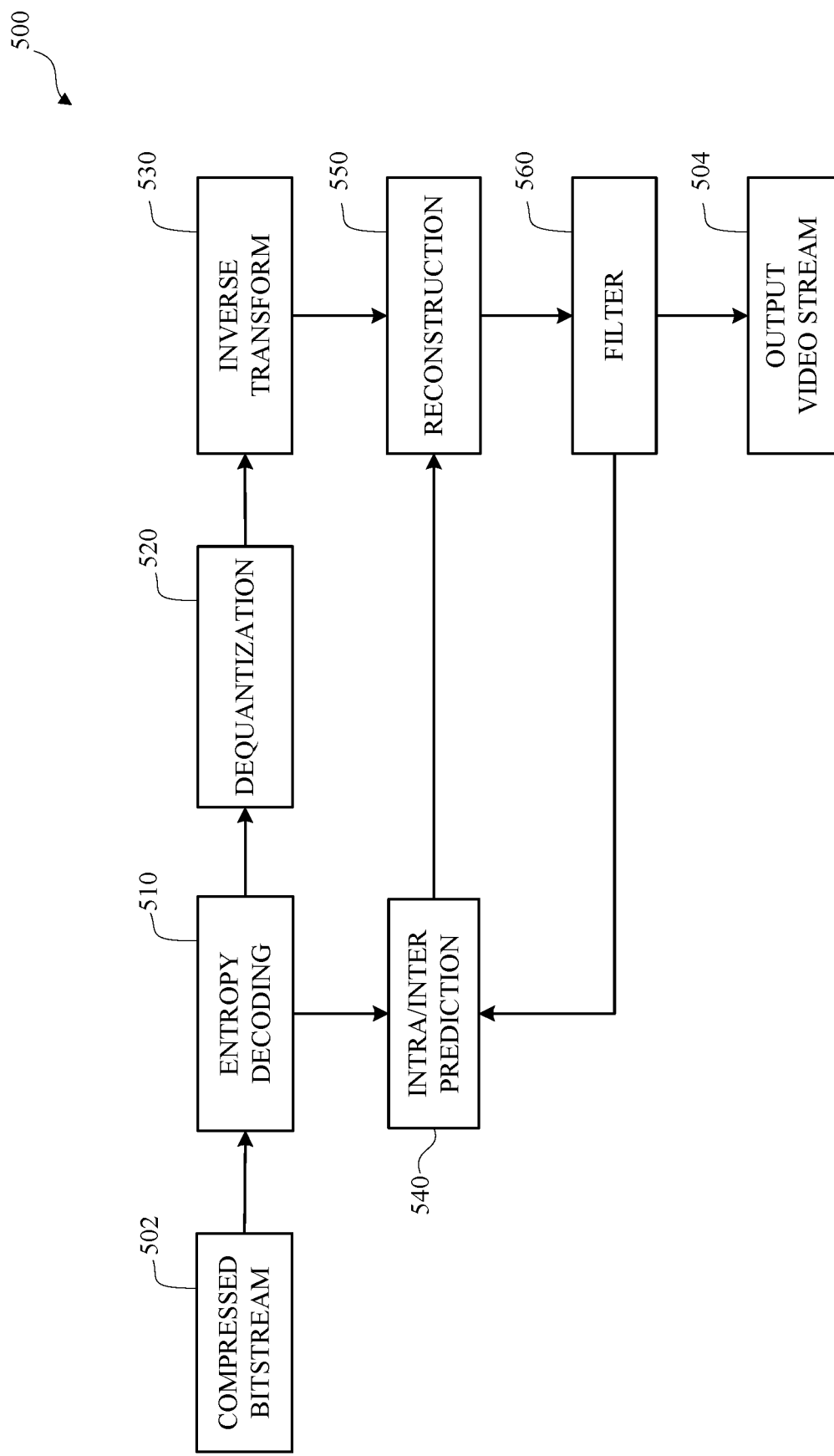
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
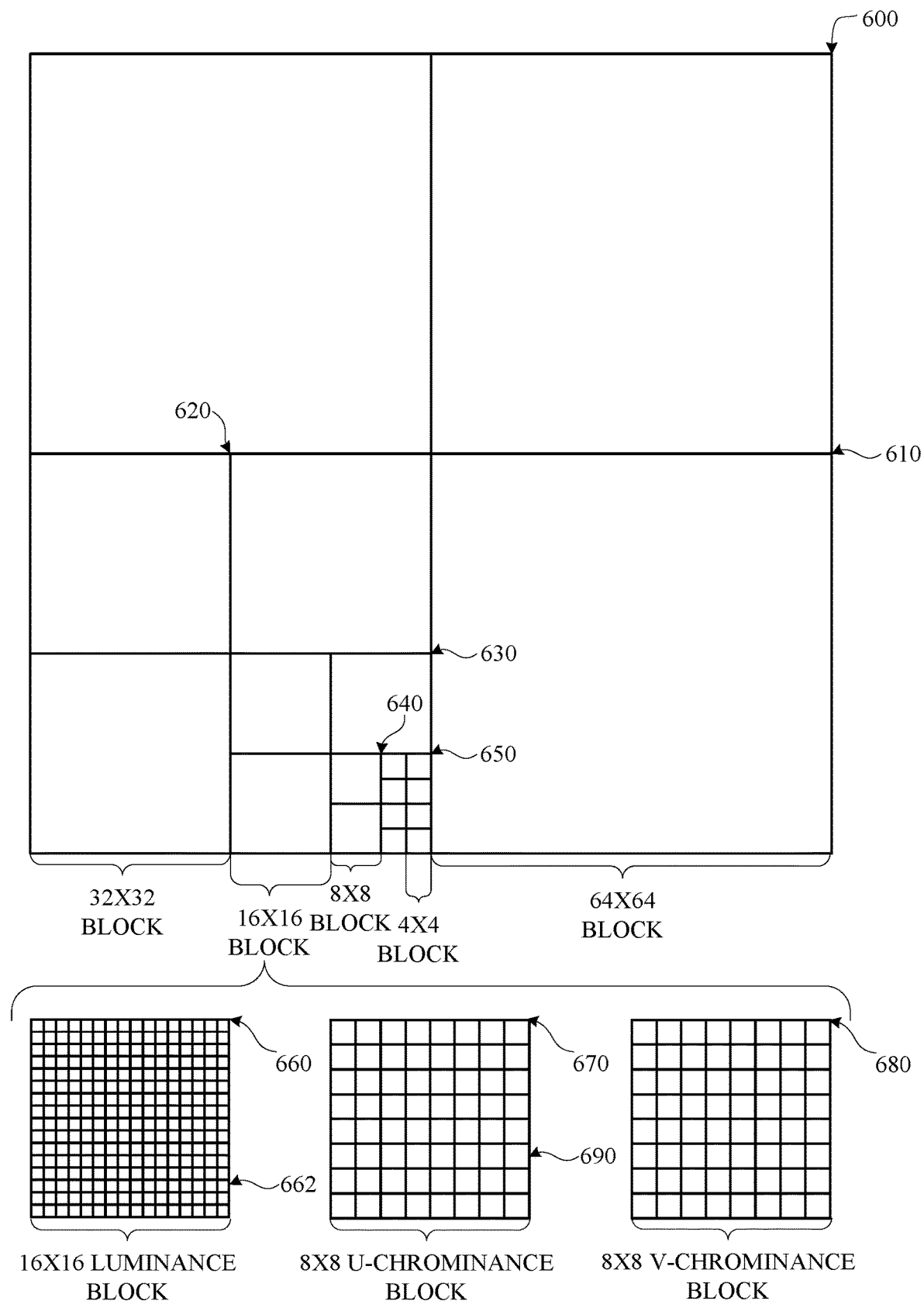
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
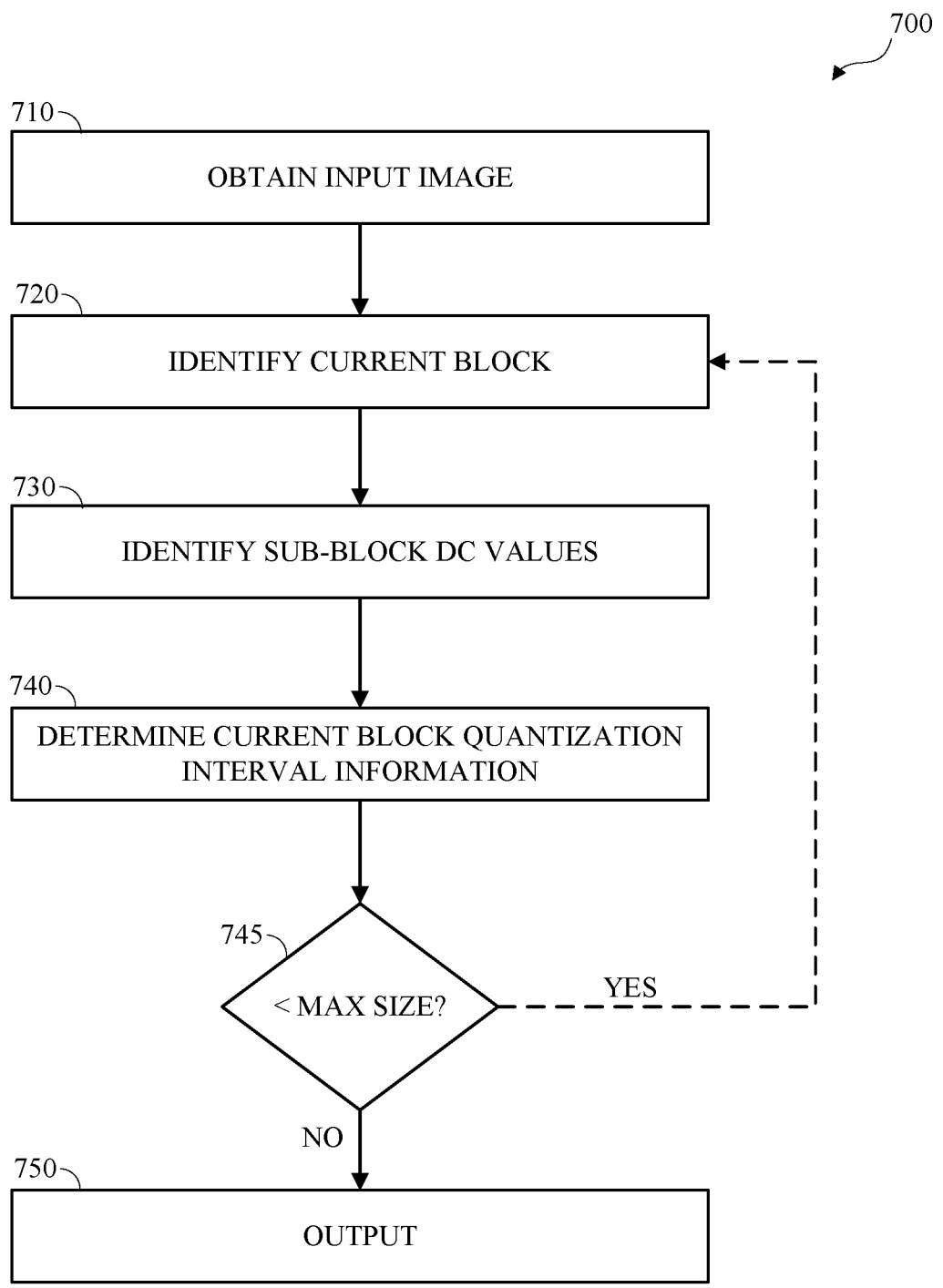
FIG. 7 is a flowchart diagram of an example of encoding using multiresolution quantization interval information in accordance with implementations of this disclosure.

FIG. 7 is a flowchart diagram of an example of encoding using multiresolution quantization interval information 700 in accordance with implementations of this disclosure. Encoding using multiresolution quantization interval information 700 may be implemented in an encoder, such as the encoder 400 shown in FIG. 4. Although the encoder 400 shown in FIG. 4 and the decoder 500 shown in FIG. 5 are described with respect to video coding, encoding using multiresolution quantization interval information 700 may be implemented for still image coding, video coding, or both.

As shown in FIG. 7, encoding using multiresolution quantization interval information 700 includes obtaining an input image at 710, identifying a current block at 720, identifying sub-block DC values at 730, determining quantization interval information for the current block at 740, and outputting at 750.

An input image may be obtained at 710. The input image may be an uncompressed input, or source, image or video frame. For example, the encoder may receive, or otherwise access, an input image or input video stream or signal, or a portion thereof, and may identify the input image or a portion of the input video stream as the current input image. Identifying an input image may include receiving one or more input images at a buffer and buffering the input images.

The current block may be identified at 720. Identifying the current block may include identifying the current block from the input image identified at 710. For example, the current block may be a block, such as block 630 shown in FIG. 6. The current block may be identified according to a block scan order. In some implementations, identifying the current block at 720 may include identifying a tile from the input image and identifying the current block from the tile. Although current frame is described with reference to forward raster scan order, any block scan order may be used.

The current block identified at 720 may be a 2N×2N block that includes two or more sub-blocks, such as N×N sub-blocks. The current block identified at 720 may include one or more transform blocks. In an example, the current image may be divided into transform 8×8 blocks and identifying the current block may include identifying a 16×16 block including four 8×8 transform blocks (sub-blocks). The current block identified at 720 may include, in the frequency domain, direct component (DC) information, such as a top-left transform coefficient of a transform block, on a block basis for blocks having a defined size (block resolution), such as 8×8.

Sub-block DC values may be identified at 730. Identifying the sub-block DC values may include identifying a top-left transform coefficient from each of the N×N sub-blocks of the 2N×2N current block. In some implementations, the 2N×2N current block may spatially overlap a transform block having a transform block size other than N×N, such as 2N×N, N×2N, 2N×2N, or larger, and pseudo-DC values corresponding to N×N transform blocks may be determined. For example, a transform block for encoding the current image may have a size of N×N, and the DC value for the transform block may be used. In another example, a transform block for encoding the current image may have a size larger than N×N in at least one dimension, and pseudo-DC values for each N×N portion of transform block may be used. Determining a pseudo-DC value may be similar to determining a DC value for the portion of the image, except that the image may be coded using a transform size larger than the portion corresponding to the pseudo-DC value. In an example, a portion of the current image may be coded using an 8×16 transform and a first pseudo-DC value may be determined for a first 8×8 portion of the image spatially concurrent with a first portion of the 8×16 transform and a second pseudo-DC value may be determined for a second 8×8 portion of the image spatially concurrent with a second portion of the 8×16 transform. In some implementations, the current block may have a defined minimum quantization interval information block size, such as 8×8, and identifying the sub-block DC values may be omitted. The DC values may be identified on a per-channel basis. For example, in an RGB format, three DC values, one for each channel, may be identified for each sub-block.

Quantization interval information may be determined for the current block at 740. The quantization interval information may indicate whether the DC values identified at 730 are above a quantization boundary (within the top half of a corresponding quantization range), such as greater than the quantization boundary, or are below the quantization boundary (within the bottom half of the corresponding quantization range), such as less than or equal to the quantization boundary. For example, a quantization interval information value of zero (0) may indicate that the DC values are in the bottom half of the corresponding quantization range, range minimum ⇐DC⇐quantization boundary, and a quantization interval information value of one (1) may indicate that the DC values are in the top half of the corresponding quantization range, quantization boundary <DC⇐range maximum. In some implementations, DC values that are equal to the quantization boundary may be identified as above the quantization boundary corresponding to a quantization interval information value of one (1).

In some implementations, the current block may have the minimum quantization interval information block size, such as 8×8, which may be the minimum transform block size, and the quantization interval information may be determined for the current block based on the DC value for the current block. For example, the DC value for an 8×8 transform block may be 19.75, quantization boundary may be 20, the corresponding quantization range may be from 19.5 to 20.5, and the quantization interval information value for the block may be identified as zero.

Determining the quantization interval information may include determining multiresolution quantization interval information. For example, quantization interval information may be determining for multiple block sizes, such as 8×8, 16×16, 32×32, and 64×64. Other block sizes may be used. The quantization boundary and quantization range may correspond with the block size, or resolution. For example, the quantization boundary for a 16×16 block may be 80 and the corresponding range may be 78 to 82.

In some implementations, the current block may be a 2N×2N block, sub-block DC values, such as sub-block DC values corresponding to four N×N sub-blocks may be identified for the current block at 730, a sum of the sub-block DC values may be determined, and the quantization interval information value may be determined based on whether the sum of the sub-block DC values is within the top half or the bottom half of the quantization range corresponding to the 2N×2N block.

For example, the current block may be a 16×16 block, the DC value for a first 8×8 transform block may be 19.75, the DC value for a second 8×8 transform block may be 20.25, the DC value for a third 8×8 transform block may be 20.75, the DC value for a fourth 8×8 transform block may be 20.75, the sum of the DC values for the sub-blocks may be 81.5, the quantization boundary corresponding to the 16×16 block may be 82, the sum of the DC values for the sub-blocks may be in the bottom half of the quantization range, and the quantization interval information value may be identified as zero (0).

In some implementations, determining the quantization interval information at 740 may include determining whether to omit the quantization interval information for a current block, such as based on a smoothness constraint, such as a maximum variance constraint. For example, the maximum variance among the DC values for the current block may be within a defined maximum variance threshold, such as within, such as equal to or less than, three quantization step sizes, and the quantization interval information for the current block may be determined at 740 and included for the current block. In another example the maximum variance among the DC values for the current block may be greater than the defined maximum variance threshold, such as greater than three quantization step sizes, and determining the quantization interval information for the current block may be omitted at 740 and quantization interval information for the current block may be omitted from outputting at 750.

The quantization interval information may be identified on a per-channel basis. For example, in an RGB format, three quantization interval information values, one for each channel, may be identified for each block. Although not shown expressly in FIG. 7, identifying the current block at 720, identifying sub-block DC values at 730, and determining quantization interval information for the current block at 740 may be performed for each (non-overlapping) block in the frame at the current block size (2N×2N). For example, the current block size (2N×2N) may be 8×8, and quantization interval information may be identified for each 8×8 block of the frame.

Whether the current block size is less than the maximum block size (or resolution) for determining quantization interval information may be determined at 745. For example, the current block size (2N×2N) may be 8×8, the maximum block size for determining quantization interval information may be 64×64, and it may be determined that the current block size is less than the maximum block size for determining quantization interval information.

In response to a determination that the current block size is equal to or greater than the maximum block size for determining quantization interval information, the quantization interval information may be output at 750. In response to a determination that the current block size is less than the maximum block size for determining quantization interval information, the current block size may be increased and identifying the current block at 720, identifying sub-block DC values at 730, and determining quantization interval information for the current block at 740 may be performed for each (non-overlapping) block in the frame at the increased current block size, as indicated by the broken direction line from 745 to 720.

For example, the current block size may be 8×8 and quantization interval information may be determined for each 8×8 block in the frame (720-740 for each 8×8 block), the current block size may be increased to 16×16 at 745 and quantization interval information may be determined for each 16×16 block in the frame (720-740 for each 16×16 block), the current block size may be increased to 32×32 at 745 and quantization interval information may be determined for each 32×32 block in the frame (720-740 for each 32×32 block), the current block size may be increased to 64×64 at 745 and quantization interval information may be determined for each 64×64 block in the frame (720-740 for each 64×64 block), the current block size of 64×64 may be determined to be equal to the maximum block size for determining quantization interval information at 745, and in response to the determination that the current block size of 64×64 is equal to or greater than the maximum block size for determining quantization interval information of 64×64, the quantization interval information may be output at 750.

The quantization interval information may be output at 750. Outputting the quantization interval information may include including the quantization interval information, such as the quantization interval information values for each channel, for each block, for each block size (or resolution) in an encoded output such as in a respective header for each respective block, such as an encoded bitstream, representing the encoded image. The quantization interval information for the image may include quantization interval information for each 8×8 portion of the image, each 16×16 portion of the image, each 32×32 portion of the image, and each 64×64 portion of the image. Although not shown expressly in FIG. 7, the transform coefficients may be quantized, and the quantized transform coefficients may be included in the output. Quantizing the transform coefficients may introduce quantization error (mach banding). The quantization interval information included in the encoded image may be used by the decoder to reduce the quantization error. For example, including the quantization interval information for 8×8 blocks, and omitting quantization interval information for larger blocks may result in a quantization error of plus or minus 2 values for a spatially corresponding 16×16 block. Including one bit of quantization interval information for the 16×16 block may reduce the quantization error for the 16×16 block to plus or minus one value.

Other implementations of encoding using multiresolution quantization interval information 700 are available. For example, the maximum block size may be 128×128. In another example, two or more bits per channel, per block, for each block size greater than the minimum block size may be included to further reduce the maximum error and corresponding quantization error (mach banding). For example, including two bits of quantization interval information for a 2N×2N block may reduce the quantization error for the 2N×2N block to plus or minus one half of one value. In some implementations, additional elements of encoding using multiresolution quantization interval information can be added, certain elements can be combined, and/or certain elements can be removed.

Figure 8:
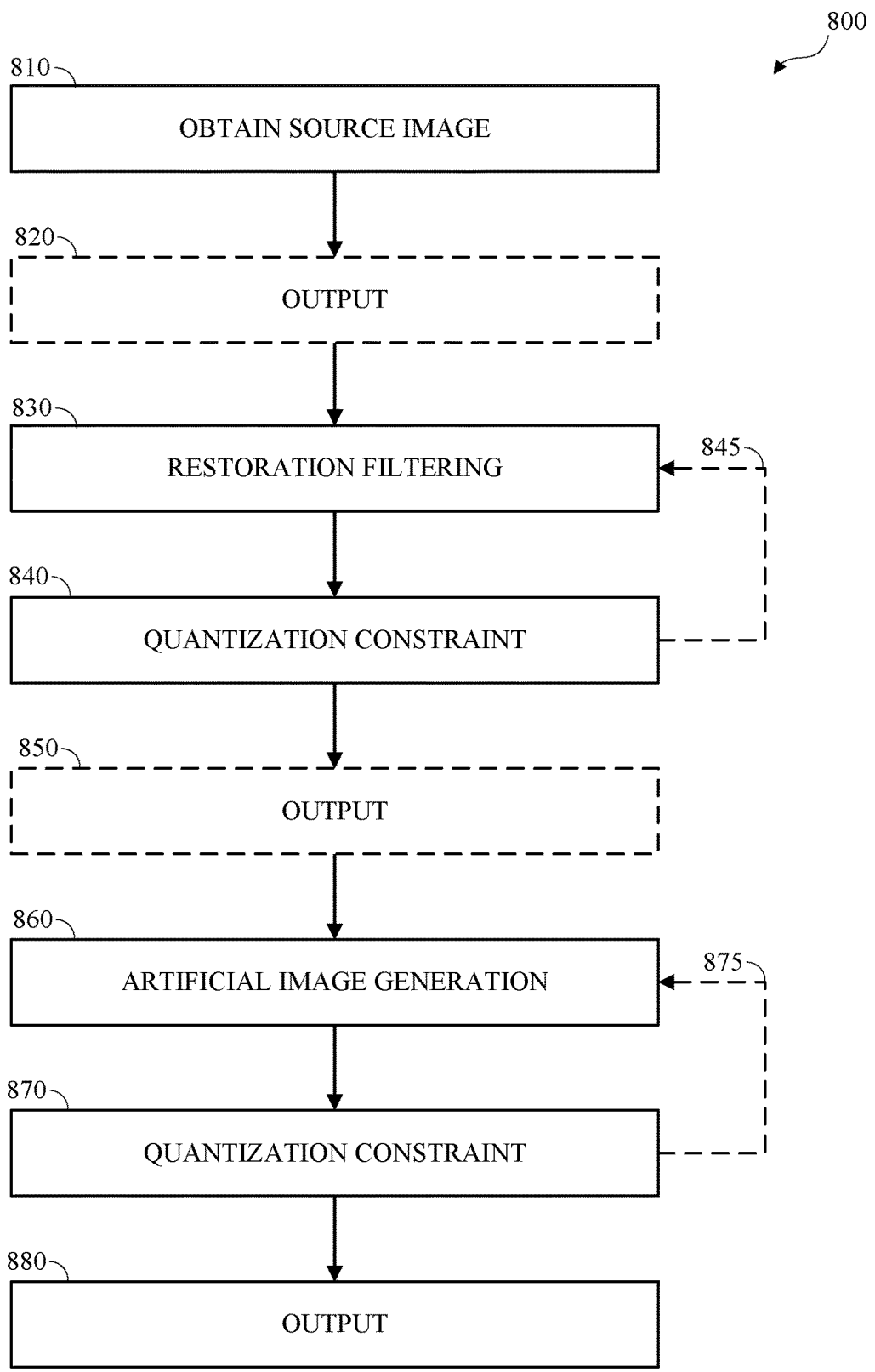
FIG. 8 is a flowchart diagram of an example of quantization constrained neural image coding in accordance with implementations of this disclosure.

FIG. 8 is a flowchart diagram of an example of quantization constrained neural image coding 800 in accordance with implementations of this disclosure. Quantization constrained neural image coding 800 may be implemented in an encoder, such as in the decode path of the encoder 400 shown in FIG. 4, or a decoder, such as the decoder 500 shown in FIG. 5. Although the encoder 400 shown in FIG. 4 and the decoder 500 shown in FIG. 5 are described with respect to video coding, quantization constrained neural image coding 800 may be implemented for still image coding, video coding, or both.

As shown in FIG. 8, quantization constrained neural image coding 800 includes obtaining a source image at 810, outputting the source image at 820, generating a restoration filtered image at 830, generating a quantization constrained restoration filtered image at 840, outputting the quantization constrained restoration filtered image at 850, generating an artificial neural network improved image at 860, generating a quantization constrained artificial neural network improved image at 870, and outputting the quantization constrained artificial neural network improved image at 880.

The source image may be obtained at 810. For example, the source image may be obtained in a defined format, such as the JPEG format, having a defined color model, such as an additive color model, such as RGB, which may include a red color channel, a green color channel, and a blue color channel. The source image may be a relatively low-quality image, which may have a relatively low bit-rate. For example, the source image may include one or more coding artifacts such as quantization banding (mach banding), tiling, or ringing. Obtaining the source image at 810 may include identifying quantization information, such as one or more quantization parameters, based on the source image. For example, the source image may include a quantization table including quantization coefficients. In some implementations, the source image may be obtained in a format similar to the JPEG format, except that the image may include multiresolution quantization interval information, such as multiresolution quantization interval information generated as shown in FIG. 7, and obtaining the quantization information may include obtaining the multiresolution quantization interval information. The multiresolution quantization interval information may include respective quantization interval information for two or more block sizes (resolutions) from a defined set of block sizes, such as 8×8, 16×16, 32×32, and 64×64. The quantization interval information for a block size may be a bit or a flag and may indicate whether the top-left transform coefficient (DC value) for the block is within the upper or lower portion of the corresponding quantization interval or range.

Obtaining the source image at 810 may include obtaining an encoded image and reconstructing the source image by decoding the encoded image. Obtaining the source image at 810 may include obtaining quantized transform coefficients and dequantizing the quantized transform coefficients to obtain transform coefficients corresponding to respective transform blocks. In some implementations, such as for relatively low-quality source images, the global color accuracy of the source image may be low. For example, the source image may be a reconstruction of an encoded or compressed image that may be generated by encoding or compressing a source image using high-compression rate, low image quality encoding or compression.

The source image may be output at 820. For example, the source image obtained at 810 may be output for presentation to a user via display device. The reconstructed source image output at 820 may include artifacts, such as mach banding, blocking, ringing, or a combination thereof. Outputting the source image at 820 may be omitted, as indicated by the broken line border at 820.

A restoration filtered image may be generated at 830. Generating the restoration filtered image may include restoration filtering the source image obtained at 810 using one or more restoration filters. For examples, the restoration filtering may include smoothing, such as selective Gaussian smoothing, or other regularization. The restoration filtered image may be a relatively high-quality image relative to the source image. For example, the restoration filtering may reduce or eliminate tiling (or blocking) artifacts, ringing artifacts, or both relative to the source image. For example, restoration filtering may include deblocking. The restoration filtering may be based on the source image, which may include the quantization interval information.

The restoration filtered image generated at 830 may differ from the source image obtained at 810. One or more portions of the restoration filtered image generated at 830 may include one or more values outside respective value ranges indicated by the quantization information identified for the source image at 810. For example, a quantized image generated by quantizing the restoration filtered image generated at 830 based on the quantization information identified for the source image at 810 may differ from the quantized source image obtained at 810.

A quantization constrained restoration filtered image may be generated at 840. Generating the quantization constrained restoration filtered image generated at 840 may include constraining, such as limiting, truncating, or rounding, values of the restoration filtered image generated at 830 based on the quantization information identified for the source image at 810.

The quantization constrained restoration filtered image generated at 840 may differ from the quantized source image obtained at 810. A quantized image generated by quantizing the quantization constrained restoration filtered image generated at 840 based on the quantization information identified for the source image at 810 may be equivalent to the source image obtained at 810. For example, the difference between the quantized image generated by quantizing the quantization constrained restoration filtered image generated at 840 based on the quantization information identified for the source image at 810 and the source image obtained at 810 may be within a defined similarity threshold, such as zero.

Generating a restoration filtered image at 830 and generating a quantization constrained restoration filtered image at 840 may be serially repeated, as indicated by the broken directional line at 845, such as one, two, or three times, wherein each iteration improves the quality, such as by removing or reducing artifacts, of the generated images relative to a previous iteration. Although shown separately in FIG. 8, generating the restoration filtered image at 830 and generating the quantization constrained restoration filtered image at 840 may be combined.

The quantization constrained restoration filtered image may be output at 850. For example, the quantization constrained restoration filtered image generated at 840 may be output for presentation to a user via display device at 850. Outputting the quantization constrained restoration filtered image at 850 may include outputting the quantization constrained restoration filtered image such that a presentation of the source image output at 820 is replaced by a presentation of the quantization constrained restoration filtered image output at 850. Outputting the quantization constrained restoration filtered image at 850 may be omitted, as indicated by the broken line border at 850.

An artificial neural network improved image (artificial image) may be generated at 860. Generating an artificial image may include using an artificial neural network (ANN), such as a deep learning neural network, a convolution of neural networks, or other machine learning technique, to generate the artificial image based on the quantization constrained restoration filtered image generated at 840. For example, the artificial neural network may be a generative artificial neural network of a conditional generative adversarial network (GAN). An artificial image may include a combination of image detail from an original or source image and artificial image detail generated by an artificial neural network.

The generative adversarial network may include the generative artificial neural network and a discriminative artificial neural network. The generative artificial neural network may generate one or more artificial images, such as based on input data, such as a source image, such as the quantization constrained restoration filtered image generated at 840. The discriminative artificial neural network may label an image as an authentic image or an artificial image. The authentic images may be images previously identified as authentic images.

The generative artificial neural network may be trained to improve the image quality of artificial images based on the image labels output by the discriminative artificial neural network (feedback from the discriminative artificial neural network), wherein training the generative artificial neural network corresponds to increasing the probability that an artificial image generated by the generative artificial neural network is labeled by the discriminative artificial neural network as an authentic image.

The discriminative artificial neural network may be trained to improve the probability of accurately labeling authentic images as authentic images and accurately labeling artificial images as artificial images, wherein information indicating the accuracy of the labeling of the artificial images may be used as feedback to the discriminative artificial neural network.

The generative artificial neural network and the discriminative artificial neural network may be trained in combination, such as in a generative adversarial network. Training the generative artificial neural network and the discriminative artificial neural network may include identifying complexity targets and training the generative artificial neural networks, the discriminative artificial neural networks, or both based on the target complexities. For example, a first generative artificial neural network may be generated for a first complexity target, a second generative artificial neural network may be generated for a second complexity target, and a third generative artificial neural network may be generated for a third complexity target. The complexity target may represent a model size or complexity, such as a cardinality of layers, a cardinality of artificial neurons, or both. The complexity target may correspond with a target set of capabilities or operating conditions of the encoder, decoder, or both, implementing quantization constrained neural image coding 800. For example, the first complexity target may correspond with a first decoder having relatively limited capabilities, the second complexity target may correspond with a second decoder having capabilities greater than the first decoder, the third complexity target may correspond with a third decoder having capabilities greater than the second decoder, such that the first generative artificial neural network may be relatively simple having relatively few layers, artificial neurons, or both. The second generative artificial neural network may be more complex than the first generative artificial neural network and may have more layers, artificial neurons, or both, than the first generative artificial neural network. The third generative artificial neural network may be more complex than the second generative artificial neural network and may have more layers, artificial neurons, or both, than the second generative artificial neural network. The complexity targets may be defined values, which may be adjustable to balance decoding time against image quality, where lower complexity corresponds with lower decoding time and lower image quality and higher complexity corresponds with higher decoding time and higher image quality.

The artificial image may be a relatively high-quality image relative to the quantization constrained restoration filtered image generated at 840. For example, the artificial image may have increased material or texture detail or quality relative to the quantization constrained restoration filtered image generated at 840. The difference between the artificial image and the corresponding source image may be image detail omitted from the source image, which may be generated based on image information included in the input to the generative artificial neural network, such as based on the source image or the quantization constrained restoration filtered image.

The artificial image generated at 860 may differ from the quantized source image obtained at 810. One or more portions of the artificial image generated at 860 may include one or more values outside respective value ranges indicated by the quantization information identified for the source image at 810. For example, a quantized image generated by quantizing the artificial image generated at 860 based on the quantization information identified for the source image at 810 may differ from the quantized source image obtained at 810. Differences between the quantized image generated by quantizing the artificial image and the source image may correspond to artificial image detail artifacts.

In some implementations, outputting the source image at 820, generating the restoration filtered image at 830, generating the quantization constrained restoration filtered image at 840, and outputting the quantization constrained restoration filtered image at 850 may be omitted and generating an artificial neural network improved image at 860 may be performed based on the source image obtained at 810.

A quantization constrained artificial neural network improved image (constrained artificial image) may be generated at 870. Generating the constrained artificial image at 870 may include constraining, such as limiting, truncating, or rounding, values of the artificial image generated at 860 based on the quantization information identified for the source image at 810.

The constrained artificial image generated at 870 may differ from the quantized source image obtained at 810. A quantized image generated by quantizing the constrained artificial image generated at 870 based on the quantization information identified for the source image at 810 may be equivalent to the source image obtained at 810. For example, the difference between the quantized image generated by quantizing the constrained artificial image generated at 870 based on the quantization information identified for the source image at 810 and the source image obtained at 810 may be within a defined similarity threshold, such as zero.

Generating the artificial image generated at 860 and generating the constrained artificial image generated at 870 may be serially repeated, as indicated by the broken directional line at 875, such as one, two, or three times, wherein each iteration improves the quality, such as by increasing image detail, of the generated images relative to a previous iteration. Although shown separately in FIG. 8, generating the artificial neural network improved image at 860 and generating the quantization constrained artificial neural network improved image at 870 may be combined.

The constrained artificial image may be output at 880. For example, the constrained artificial image generated at 870 may be output for presentation to a user via display device at 880. Outputting the constrained artificial image at 880 may include outputting the quantization constrained restoration filtered image such that a presentation of the quantization constrained restoration filtered image output at 850, or the source image output at 820, is replaced by a presentation of the constrained artificial image output at 880. Outputting the constrained artificial image at 880 may include storing or transmitting the constrained artificial image.

The resource utilization for restoration filtering at 830 may be low relative to the resource utilization for artificial image generation at 860. For example, an iteration of restoration filtering at 830 and restoration filtering quantization constraint at 840 may utilize 100 or 1000 fewer resources than an iteration of artificial image generation at 860 and artificial image constraint at 870. In an example, an iteration of restoration filtering at 830 may be performed in ten milliseconds, quantization constraints may be applied in three milliseconds, and the artificial image generation may be performed in one or two seconds.

In some implementations, one or more aspects of quantization constrained neural image coding 800 may be adjusted based on one or more criteria. For example, the cardinality of iterations of generating the restoration filtered image at 830 and generating the quantization constrained restoration filtered image at 840 may be adjusted. In another example, the cardinality of iterations of generating the artificial neural network improved image at 860 and generating the quantization constrained artificial neural network improved image at 870 may be adjusted, the complexity of generating the artificial neural network improved image at 860 may be adjusted, or both.

Adjusting the cardinality of iterations may include using fewer, such as zero or one, iterations based on relatively high source image quality (few blocking or ringing artifacts), based on prioritization of speed over quality, based on resource availability limitations, or a combination thereof. Adjusting the cardinality of iterations may include using a greater cardinality of iterations, such as two or more iterations, based on relatively low source image quality (many blocking or ringing artifacts), based on prioritization of quality over speed, based on high resource availability, or a combination thereof. The cardinality of iterations of generating the restoration filtered image at 830 and generating the quantization constrained restoration filtered image at 840 may be adjusted independently of the cardinality of iterations of generating the artificial neural network improved image at 860 and generating the quantization constrained artificial neural network improved image at 870.

Adjusting the complexity of generating the artificial neural network improved image at 860 may include adjusting the number of layers of the artificial neural network, the number of neurons per layer (or in respective layers), the block size (or resolution) used, or the like, based on prioritizing for speed, prioritizing for quality, resource availability, or a combination thereof. For example, for a relatively low complexity target, the cardinality of iterations of restoration filtering at 830, the cardinality of iterations of artificial image generation at 860, or both may be limited, such as to one iteration. In another example, for a relatively high complexity target, the cardinality of iterations of restoration filtering at 830, the cardinality of iterations of artificial image generation at 860, or both may be increased, such as to greater than three iterations.

As used herein, the terms "optimal", "optimized", "optimization", or other forms thereof, are relative to a respective context and are not indicative of absolute theoretic optimization unless expressly specified herein.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
generating, by a processor, an artificial image, wherein generating the artificial image includes:
obtaining a source image;
identifying quantization information from the source image, wherein identifying the quantization information includes identifying multiresolution quantization interval information from the source image;
generating a restoration filtered image by restoration filtering the source image;
generating a constrained restoration filtered image by constraining the restoration filtered image based on the quantization information;
obtaining an unconstrained artificial image based on the constrained restoration filtered image and a generative artificial neural network obtained using a generative adversarial network; and
obtaining the artificial image by constraining the unconstrained artificial image based on the quantization information; and
outputting the artificial image.

2. The method of claim 1, wherein:
generating the restoration filtered image includes:
generating a first restoration filtered image by restoration filtering the source image;
generating a second restoration filtered image by restoration filtering a first constrained restoration filtered image; and
generating a third restoration filtered image by restoration filtering a second constrained restoration filtered image; and
generating the constrained restoration filtered image includes:
generating the first constrained restoration filtered image by constraining the first restoration filtered image based on the quantization information;
generating the second constrained restoration filtered image by constraining the second restoration filtered image based on the quantization information;
generating a third constrained restoration filtered image by constraining the third restoration filtered image based on the quantization information; and
using the third constrained restoration filtered image as the constrained restoration filtered image.

3. The method of claim 1, wherein:
obtaining the unconstrained artificial image includes:
obtaining a first unconstrained artificial image based on the constrained restoration filtered image;
obtaining a second unconstrained artificial image based on a first artificial image; and
obtaining a third unconstrained artificial image based on a second artificial image; and
obtaining the artificial image includes:
obtaining the first artificial image by constraining the first unconstrained artificial image based on the quantization information;
obtaining the second artificial image by constraining the second unconstrained artificial image based on the quantization information;
obtaining a third artificial image by constraining the third unconstrained artificial image based on the quantization information; and
using the third artificial image as the artificial image.

4. A method comprising:
generating, by a processor, an artificial image, wherein generating the artificial image includes:
obtaining a source image;
reading quantization information from the source image;
obtaining the artificial image based on the source image, the quantization information, and a machine learning model; and
outputting the artificial image.

5. The method of claim 4, wherein reading the quantization information includes reading multiresolution quantization interval information from the source image.

6. The method of claim 4, wherein:
generating the artificial image includes outputting the source image prior to outputting the artificial image.

7. The method of claim 4, wherein:
the machine learning model is a generative artificial neural network; and
generating the artificial image includes obtaining the generative artificial neural network using a generative adversarial network.

8. The method of claim 7, wherein generating the artificial image includes:
generating the artificial image based on a defined cardinality of iterations of artificial image generation, wherein each iteration of the artificial image generation includes:
inputting an artificial image generation input image to the generative artificial neural network;
in response to inputting the artificial image generation input image to the generative artificial neural network, obtaining an unconstrained artificial image from the generative artificial neural network; and
constraining the unconstrained artificial image based on the quantization information to obtain the artificial image.

9. The method of claim 8, wherein a first iteration of artificial image generation includes using the source image as the artificial image generation input image.

10. The method of claim 8, wherein each iteration of artificial image generation subsequent to the first iteration of artificial image generation includes using the artificial image obtained by an immediately preceding iteration of artificial image generation as the artificial image generation input image.

11. The method of claim 8, wherein constraining the unconstrained artificial image based on the quantization information includes constraining the unconstrained artificial image based on the quantization information such that a difference between a quantized image generated by quantizing the artificial image based on the quantization information and a quantized source image is within a defined similarity threshold.

12. The method of claim 8, wherein generating the artificial image includes:
generating a constrained restoration filtered image based on a defined cardinality of iterations of constrained restoration filtered image generation, wherein each iteration of constrained restoration filtered image generation includes:
    generating a restoration filtered image by restoration filtering a restoration filtering input image; and
    constraining the restoration filtered image based on the quantization information to obtain the constrained restoration filtered image.

13. The method of claim 12, wherein:
    a first iteration of constrained restoration filtered image generation includes using the source image as the restoration filtering input image; and
    a first iteration of artificial image generation includes using the constrained restoration filtered image as the artificial image generation input image.

14. The method of claim 13, wherein each iteration of constrained restoration filtered image generation subsequent to the first iteration of constrained restoration filtered image generation includes using the constrained restoration filtered image obtained by an immediately preceding iteration of constrained restoration filtered image generation as the restoration filtering input image.

15. The method of claim 12, wherein constraining the restoration filtered image based on the quantization information includes constraining the restoration filtered image based on the quantization information such that a difference between a quantized image generated by quantizing the constrained restoration filtered image based on the quantization information and a quantized source image is within the defined similarity threshold.

16. The method of claim 12, wherein generating the artificial image includes outputting the constrained restoration filtered image prior to outputting the artificial image.

17. A method comprising:
    generating, by a processor, an artificial image, wherein generating the artificial image includes:
        obtaining a source image;
        identifying quantization information from the source image;
        generating a constrained restoration filtered image based on a defined cardinality of iterations of constrained restoration filtered image generation, wherein each iteration of constrained restoration filtered image generation includes:
            generating a restoration filtered image by restoration filtering a restoration filtering input image, wherein:
                on a condition that the iteration of constrained restoration filtered image generation is a first iteration of constrained restoration filtered image generation, using the source image as the restoration filtering input image; and
                on a condition that the iteration of constrained restoration filtered image generation is an iteration of constrained restoration filtered image generation subsequent to the first iteration of constrained restoration filtered image generation, using the constrained restoration filtered image obtained by an immediately preceding iteration of constrained restoration filtered image generation as the restoration filtering input image; and
            constraining the restoration filtered image based on the quantization information to obtain the constrained restoration filtered image;
        obtaining the artificial image based on an artificial image generation input image, the quantization information, and a generative artificial neural network, wherein obtaining the artificial image includes a defined cardinality of iterations of artificial image generation, wherein each iteration of the artificial image generation includes:
            inputting the artificial image generation input image to the generative artificial neural network, wherein:
                on a condition that the iteration of the artificial image generation is a first iteration of artificial image generation, using the constrained restoration filtered image as the artificial image generation input image; and
                on a condition that the iteration of the artificial image generation is an iteration of artificial image generation subsequent to the first iteration of artificial image generation, using the artificial image obtained by an immediately preceding iteration of artificial image generation as the artificial image generation input image;
            in response to inputting the artificial image generation input image to the generative artificial neural network, obtaining an unconstrained artificial image from the generative artificial neural network; and
            constraining the unconstrained artificial image based on the quantization information to obtain the artificial image; and
        outputting the artificial image.

18. The method of claim 17, wherein generating the artificial image includes obtaining the generative artificial neural network using a generative adversarial network.

19. The method of claim 17, wherein:
    constraining the unconstrained artificial image based on the quantization information includes constraining the unconstrained artificial image based on the quantization information such that a difference between a quantized image generated by quantizing the artificial image based on the quantization information and a quantized source image is within a defined similarity threshold; and
    constraining the restoration filtered image based on the quantization information includes constraining the restoration filtered image based on the quantization information such that a difference between a quantized image generated by quantizing the constrained restoration filtered image based on the quantization information and a quantized source image is within the defined similarity threshold.

20. The method of claim 17, wherein generating the artificial image includes:
    outputting the source image prior to outputting the constrained restoration filtered image; and
    outputting the constrained restoration filtered image prior to outputting the artificial image.

* * * * *